UNITED STATES PATENT OFFICE.

AMBROSE MONELL, OF PITTSBURG, AND REES JAMES, OF MUNHALL, PENNSYLVANIA, ASSIGNORS TO THE CARNEGIE STEEL COMPANY, OF PITTSBURG, PENNSYLVANIA.

MANUFACTURE OF OPEN-HEARTH STEEL.

SPECIFICATION forming part of Letters Patent No. 663,701, dated December 11, 1900.

Application filed June 18, 1900. Serial No. 20,648. (No specimens.)

*To all whom it may concern:*

Be it known that we, AMBROSE MONELL, of Pittsburg, and REES JAMES, of Munhall, in the county of Allegheny and State of Pennsylvania, have invented a new and useful Improvement in the Manufacture of Open-Hearth Steel, of which the following is a full, clear, and exact description.

Our invention relates to an improvement upon the process described in Letters Patent No. 652,226, granted on June 19, 1900, to Ambrose Monell for an improvement in the manufacture of open-hearth steel, wherein molten pig-iron is charged into a basic open-hearth furnace containing iron oxid and lime, and at an early stage of the process and while the iron is at a comparatively low temperature the bulk of the slag is withdrawn, taking with it substantially all the phosphorus from the iron, and the heating of the bath of metal is then continued and the carbon oxidized and reduced to the point at which the metal is to be tapped. We have discovered that the process can be greatly expedited and improved results secured by employing as the oxygen compound which is charged into the furnace the cinder from heating-furnaces or the scale from rolling-mills instead of iron ore.

We will describe the preferable manner in which our invention is practiced, premising that within the scope of the invention as defined in the claims the steps of the process may be varied in many ways by the skilled metallurgist.

We charge into a basic lined open-hearth furnace lime and mill cinder or scale, the cinder or scale being added preferably in the proportion of twenty-five per cent. of the pig metal intended to be charged and the lime being added as limestone, preferably in the proportion of six to seven per cent. of the metal. The lime and cinder thus introduced are heated until the cinder comes to a fluid or semifluid condition. We then add the molten pig metal, whereupon a violent reaction occurs, by which the phosphorus is almost entirely eliminated from the metal and taken up by the slag, and the carbon is also reduced somewhat and very rapidly, being brought, preferably, to from one and one-fourth to two per cent. at the end of thirty minutes. The slag is withdrawn, preferably, as it boils up, so that it begins to come off as soon as the iron is introduced, and at the end of, say, thirty minutes from the introduction of the iron about eighty per cent. of the slag has preferably been removed, leaving the surface of the metal nearly bare or with a thin covering of slag and in the best condition to cause the metal to be rapidly heated in the subsequent stages of the process and the carbon to be oxidized by the flame and by further additions of cinder or ore, as required. When the slag has thus been removed, the metal is substantially dephosphorized—that is to say, it is reduced to about ten per cent. or less—and the eliminated phosphorus and silicon are removed with the slag. The dephosphorization is thus effected while the iron is at a comparatively low temperature relatively to the high temperature to which it is raised in the subsequent stages of the process. The decarbonization, however, has not been completed. The slag having been withdrawn from the furnace, we heat the bath as rapidly as possible to about the temperature required for tapping, and additions of mill cinder or scale or ore are added, if necessary, to reduce the carbon. The oxidizing action of the flame, together with such additions, brings down the carbon with great rapidity, and when it is reduced to the proper point, which may be in four hours, more or less, from the time of removing the bulk of the slag, the metal is tapped into a ladle, and additions of ferrosilicon and ferromanganese may be made in the usual manner for the purpose of incorporating silicon and manganese in the product. The advantages of using mill cinder or scale in accordance with our invention are that time is saved and the operations of the furnace at all its stages are greatly accelerated. Thus the cinder can be brought to the desired state of fusion at the beginning of the operation in about half the time in which ore can be raised to the white heat ordinarily required before introducing the metal, and as the cinder is or may be partly liquid when the metal is introduced the reaction which takes place is much more rapid and the carbon is reduced more quickly. There is more life and action during the entire working of a cinder heat than with one in which ore is employed. There is an advantage also in the fact that the cinder and scale contain very little phosphorus, and this prevents contamination of the bath and makes it unnecessary to add lime during the working of the heat. The cinder also does not affect the furnace-bottom injuriously.

Within the scope of our invention instead of using only mill cinder or scale we may substitute for a portion of the same a percentage of iron ore; but we do not regard this so desirable as to use the mill cinder or scale alone.

Cinder which we have found suitable for our process contains 3.80 per cent. of silica, .70 per cent. of iron, and .031 per cent. of phosphorus; but our invention is not limited to the employment of such proportions, since

What we claim is—

1. The method herein described of making steel, which consists in introducing into a basic open-hearth furnace mill cinder or scale and lime and molten pig-iron, substantially dephosphorizing the iron while the iron is at a comparatively low temperature, and at an early period of the operation of decarbonizing, without withdrawing the metal, withdrawing from the furnace the bulk of the slag containing the phosphorus eliminated from the metal, and heating the bath of metal and oxidizing the carbon until the carbon has been reduced to the point at which the metal is to be tapped; substantially as described.

2. The method herein described of making steel, which consists in introducing into a basic open-hearth furnace mill cinder or scale and lime, melting the cinder or scale, introducing molten pig-iron, substantially dephosphorizing the same while the iron is at a comparatively low temperature, and at an early period of the operation of decarbonizing, without withdrawing the metal, withdrawing from the furnace the bulk of the slag containing the phosphorus eliminated from the metal, and heating the bath of metal and oxidizing the carbon until the carbon has been reduced to the point at which the metal is to be tapped; substantially as described.

In testimony whereof we have hereunto set our hands.

AMBROSE MONELL.
REES JAMES.

Witnesses:
W. C. CONEY,
H. M. CORWIN.